(12) United States Patent
Okushita et al.

(10) Patent No.: US 9,090,738 B2
(45) Date of Patent: Jul. 28, 2015

(54) PRODUCTION METHOD OF POLYAMIDE RESIN

(75) Inventors: Hiroshi Okushita, Yamaguchi (JP); Kouichirou Kurachi, Yamaguchi (JP); Masato Shimokawa, Yamaguchi (JP)

(73) Assignee: Ube Industries, Ltd. (JP)

( * ) Notice: Subject to any disclaimer, the term of this patent is extended or adjusted under 35 U.S.C. 154(b) by 476 days.

(21) Appl. No.: 12/532,866

(22) PCT Filed: Mar. 26, 2008

(86) PCT No.: PCT/JP2008/056515
§ 371 (c)(1),
(2), (4) Date: Sep. 24, 2009

(87) PCT Pub. No.: WO2008/123531
PCT Pub. Date: Oct. 16, 2008

(65) Prior Publication Data
US 2010/0113737 A1    May 6, 2010

(30) Foreign Application Priority Data

Mar. 27, 2007   (JP) ................. 2007-081787

(51) Int. Cl.
*C08G 69/28* (2006.01)
*C08G 69/26* (2006.01)

(52) U.S. Cl.
CPC .............. *C08G 69/26* (2013.01); *C08G 69/265* (2013.01); *C08G 69/28* (2013.01)

(58) Field of Classification Search
USPC .................................. 528/343, 335–336, 347
See application file for complete search history.

(56) References Cited

U.S. PATENT DOCUMENTS

| | | | | |
|---|---|---|---|---|
| 2,130,523 | A | * | 9/1938 | Carothers ............... 528/335 |
| 3,139,417 | A | * | 6/1964 | Duxbury ............... 528/336 |
| 3,890,281 | A | | 6/1975 | Angstadt et al. |
| 5,093,466 | A | | 3/1992 | Patton et al. |

(Continued)

FOREIGN PATENT DOCUMENTS

EP      0 659 799 A2    6/1995
EP      2 096 133 A1    9/2009

(Continued)

OTHER PUBLICATIONS

S.W. Shalaby et al., "Stucture and Thermal Stability of Aliphatic Polyoxamides," Journal of Polymer Science: Polymer Physics Edition, vol. 11, 1973, pp 1-14.

(Continued)

*Primary Examiner* — Rachel Kahn
(74) *Attorney, Agent, or Firm* — DLA Piper LLP (US)

(57) ABSTRACT

To provide a method for producing a polyoxamide resin by one-step polymerization without performing a pre-polycondensation step in a solvent, which is necessary in the conventional production of a polyoxamide resin. A method of mixing an oxalic acid diester and a diamine in a pressure-resistant vessel and subjecting the mixture to polymerization under pressure in the presence of an alcohol produced by a polycondensation reaction and then to melt polymerization at a temperature not lower than the melting point of the produced polymer preferably while extracting the alcohol, thereby producing a polyoxamide resin by one-step polymerization without using a solvent except for an alcohol that is produced by polycondensation of raw materials in the production process.

7 Claims, 1 Drawing Sheet

(56) References Cited

U.S. PATENT DOCUMENTS

| | | | |
|---|---|---|---|
| 5,223,603 A | | 6/1993 | Patton et al. |
| 5,670,608 A | * | 9/1997 | Oka et al. .................. 528/322 |

FOREIGN PATENT DOCUMENTS

| | | | |
|---|---|---|---|
| FR | 881 333 | A | 4/1943 |
| FR | 894 171 | A | 12/1944 |
| GB | 781 289 | A | 8/1957 |
| GB | 1 225 621 | A | 3/1971 |
| JP | 47-44996 | B1 | 11/1972 |
| JP | 5-506466 | A | 9/1993 |
| JP | 11-343337 | A | 12/1999 |
| JP | 2004204027 | A * | 7/2004 |
| JP | 2006-057033 | A | 3/2006 |
| WO | 91/13113 | A1 | 9/1991 |

OTHER PUBLICATIONS

L. Franco et al., "Structure and Morphology of Odd Polyoxamides [Nylon 9.2]. A New Example of Hydrogen-Bonding Interactions in Two Different Directions," vol. 31, 1998, pp. 3912-3924.

* cited by examiner

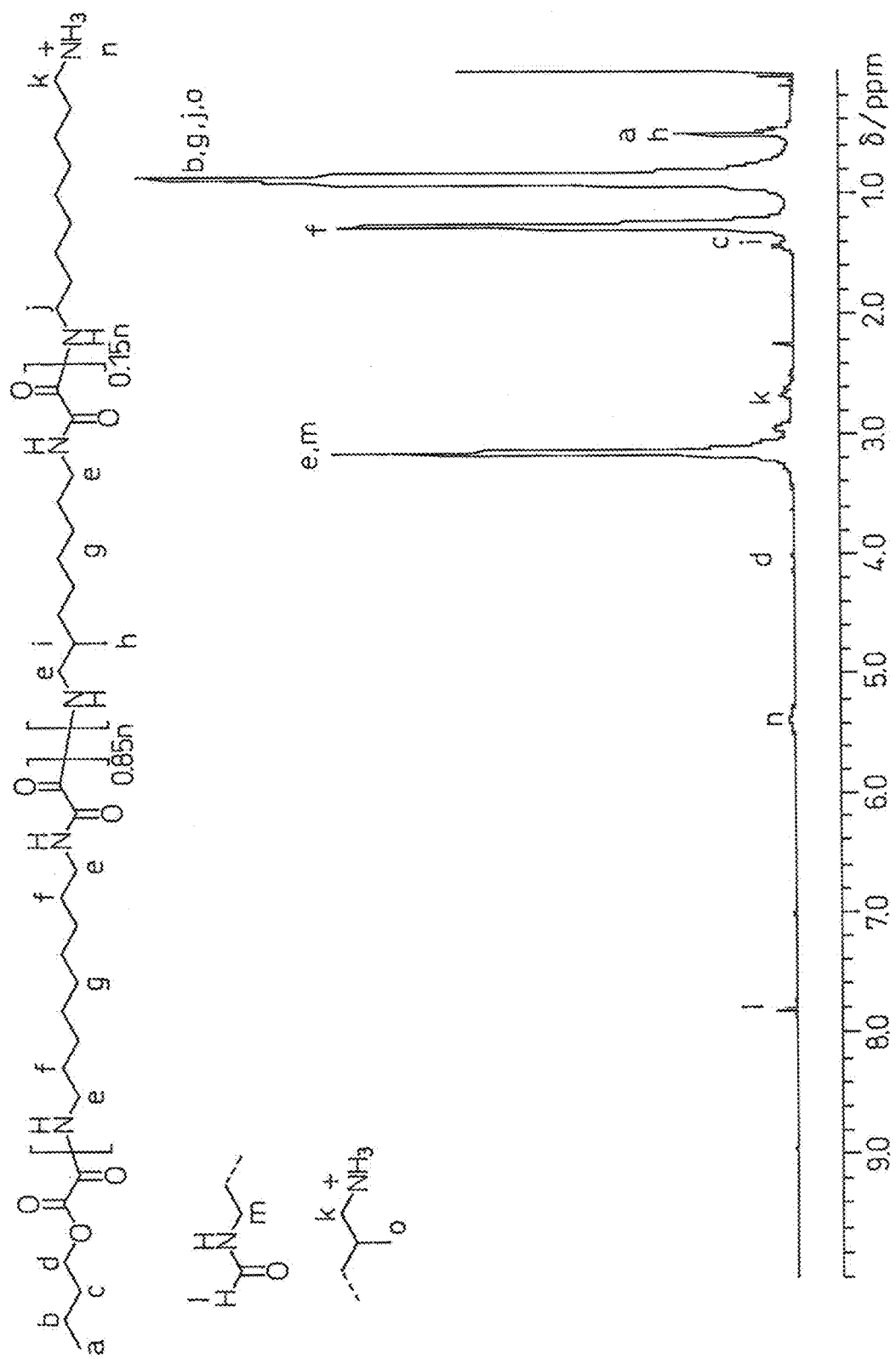

PRODUCTION METHOD OF POLYAMIDE RESIN

CROSS-REFERENCE TO RELATED APPLICATIONS

This application is based upon and claims the benefit of priority from Japanese Patent Application No. 2007-81787, filed on Mar. 27, 2007, the disclosures of which are incorporated herein by reference.

TECHNICAL FIELD

The present invention relates to a production method of a polyamide resin. More specifically, the present invention relates to a method for producing a polyamide resin where the dicarboxylic acid component is oxalic acid.

BACKGROUND ART

A polyamide resin where the dicarboxylic acid component is oxalic acid is called a polyoxamide resin and is known to have a high melting point and a low saturated water absorption compared with other polyamide resins having the same amino group concentration (see, Japanese Unexamined Patent Publication (Kokai) No. 2006-57033).

Polyoxamide resins using various diamines as the diamine component have heretofore been proposed. The polyoxamide resin is obtained by the polycondensation of oxalic acid or an oxalic acid diester with an aliphatic or aromatic diamine. However, in the case of using oxalic acid as the monomer, the oxalic acid itself thermally decomposes above 180° C. and the end of oxalic acid is also end-capped during the thermal decomposition. For this reason, there is not known a synthesis example where a polyoxamide resin having a high molecular weight is obtained.

On the other hand, there is also known a method for producing a polyoxamide resin where an oxalic acid diester such as dialkyl oxalate is used as a monomer, and polyoxamide resins by polycondensation with various diamines have been proposed. For example, a large number of polyoxamide resins such as polyoxamide resin using 1,10-decanediamine, 1,9-nonanedimaine or 1,8-octanediamine as the diamine component (see, Japanese Unexamined Patent Publication (Kohyo) No. 5-506466) and polyoxamide resin using 1,6-hexanediamine as the diamine component (see, S. W. Shalaby., J. Polym. Sci., 11, 1 (1973)) have been proposed.

However, for all known polyoxamide resins, the production requires a two-step polymerization process, that is, a pre-polycondensation step of performing a polycondensation reaction in a solvent such as toluene to obtain a prepolymer, and a post-polycondensation step of distilling off the solvent from the obtained prepolymer and then performing melt polymerization or solid phase polymerization to obtain a polymer. Accordingly, the production of a poly-oxamide resin has a problem that a large amount of energy and time is required for distilling off the solvent, which is not suitable for industrial production.

DISCLOSURE OF THE INVENTION

An object of the present invention is to provide a method for producing a poly-oxamide resin by one-step polymerization without performing a pre-polycondensation step in a solvent, which is necessary in the conventional production of a polyoxamide resin.

As a result of intensive studies to attain the above-described object, the present inventors have found a method of mixing an oxalic acid diester and a diamine in a pressure-resistant vessel and subjecting the mixture to polymerization under pressure in the presence of an alcohol produced by a polycondensation reaction of the oxalic acid diester and the diamine and then to melt polymerization at a temperature not lower than the melting point of the produced polymer preferably while extracting the alcohol, thereby producing a polyoxamide resin by one-step polymerization without using a solvent except for an alcohol that is produced by polycondensation of raw materials in the production process. The present invention has been accomplished based on this finding.

Thanks to the production method of a polyamide resin of the present invention, one-step polymerization becomes possible without performing a solution polymerization step that is required in the production of an polyoxamide resin of conventional techniques.

Since the solution polymerization step is not required, it becomes unnecessary to add a solvent that has been conventionally added together with oxalic acid or an oxalic acid diester and a diamine.

BRIEF DESCRIPTION OF THE DRAWINGS

FIG. 1 illustrates an NMR spectrum in heavy sulfuric acid of the polyoxamide resin obtained in Example 1 and the attribution of peaks.

BEST MODE FOR CARRYING OUT THE INVENTION (1) Constituent Components of Polyamide As for the oxalic acid source of a polyoxamide resin that is intended to be produced in the present invention, an oxalic acid diester is used. The oxalic acid diester is not particularly limited as long as it has reactivity with an amino group, and examples thereof include an oxalic acid diester of an aliphatic monohydric alcohol, such as dimethyl oxalate, diethyl oxalate, di-n- (or i-)propyl oxalate and di-n-(or i- or tert-)butyl oxalate, an oxalic acid dieter of an alicyclic alcohol, such as dicyclohexyl oxalate, and an oxalic acid diester of an aromatic alcohol, such as diphenyl oxalate. Among these, dibutyl oxalate is preferred.

The diamine as a raw material includes one member or a mixture of two or more members, selected from an aliphatic diamine such as ethylenediamine, propylenediamine, 1,4-butanediamine, 1,5-pentanediamine, 1,6-hexanediamine, 1,7-heptanediamine, 1,8-octanediamine, 1,9-nonanediamine, 1,10-decanediamine, 1,12-dodecanediamine, 3-methyl-1,5-pentanediamine, 2,2,4-trimethyl-1,6-hexanediamine, 2,4,4-trimethyl-1,6-hexanediamine, 2-methyl-1,8-octanediamine and 5-methyl-1,9-nonanediamine, an alicyclic diamine such as cyclohexanediamine, methylcyclohexanediamine and isophoronediamine, and an aromatic diamine such as p-phenylenediamine, m-phenylenediamine, xylenediamine, 4,4'-diaminodiphenylmethane, 4,4'-diaminodiphenylsulfone and 4,4'-diaminodiphenyl ether.

(2) Production Method of Polyamide

The production method of the present invention is specifically described below.

The melting point of polyoxamide is higher than the boiling point of monomers such as oxalic acid diester and therefore, there has been conventionally employed a method where a diamine and an oxalic acid diester are reacted in a solvent to prepare a polyoxamide having a certain molecular weight (pre-polymerization) and when monomers having a low boiling point are used up, the solvent is removed and melt polymerization is performed (post-polymerization). If a solvent is not present in the pre-polymerization, the polyoxamide precipitates in a low molecular weight state and undergoes solid-liquid separation to allow a large amount of an unreacted monomer to remain. To solve this problem, after dissolving monomers by using a solvent, a polyoxamide with little residual monomers and a higher molecular weight is produced by pre-polymerization. On the other hand, according to the present invention, an alcohol that is produced resulting from the reaction of an oxalic acid ester is utilized as the solvent. The alcohol is not allowed to evaporate under pressure and used as a solvent, whereby one-step polymerization can be realized. The pressure is not applied to adjust the reaction pressure but it is sufficient if the alcohol does not evaporate. However, the polymerization in the present invention is an equilibrium reaction and the alcohol is removed for completing the polymerization.

A diamine is put in a pressure-resistant vessel and after nitrogen substitution, the temperature is raised to the reaction temperature under a confining pressure. Thereafter, an oxalic acid diester is injected into the pressure-resistant vessel while keeping the state under a confining pressure at the reaction temperature, and a polycondensation reaction is started. The reaction temperature is not particularly limited as long as it is a temperature at which the polyoxamide produced by the reaction of the diamine with the oxalic acid diester can maintain the slurry or solution state in an alcohol produced at the same time and does not decompose by heat.

For example, in the case of a polyoxamide resin starting from dibutyl oxalate and a diamine composed of a mixture of 1,9-nonanediamine and 2-methyl-1,8-octanediamine in which the molar ratio of 1,9-nonanediamine to 2-methyl-1,8-octanediamine is from 6:94 to 99:1, the reaction temperature is preferably from 180 to 240° C. Also, the charging ratio between the oxalic acid diester and the diamine is, in terms of oxalic acid diester/above diamine, from 0.8 to 1.5 (by mol), preferably from 0.91 to 1.1 (by mol), more preferably from 0.99 to 1.01 (by mol).

In the reaction of the present invention, even when the diamine is a diamine other than 1,9-nonanediamine and 2-methyl-1,8-octanediamine, an alcohol generated in the pre-poly-merization is used as the solvent, and the reaction method is substantially the same, with the only exception that the temperature condition somewhat changes.

Subsequently, while keeping the inside of the pressure-resistance vessel in the state under a confining pressure, the temperature is raised to a level not lower than the melting point of the polyoxamide resin and not higher than the temperature causing thermal decomposition. For example, in the case of a polyoxamide resin starting from dibutyl oxalate and a diamine composed of 1,9-nonanediamine and 2-methyl-1, 8-octanediamine in which the molar ratio of 1,9-nonanediamine to 2-methyl-1,8-octanediamine is 85:15, the melting point is 235° C. and therefore, the temperature is preferably raised to a range from 240 to 280° C. The pressure in the pressure-resistant vessel after reaching a predetermined temperature is nearly equal to the saturated vapor pressure of the alcohol produced. Thereafter, the pressure is released while distilling off the alcohol produced, and, if needed, a polycondensation reaction is continuously performed under atmospheric pressure with nitrogen flow or under reduced pressured. In the case of performing polymerization under reduced pressure, the ultimate pressure is preferably from 760 to 0.1 Torr.

(3) Characteristics and Physical Properties of Polyamide

The polyamide obtained by the present invention is not particularly limited in its molecular weight, but the relative viscosity $\eta r$ measured at 25° C. by using a 96% sulfuric acid solution having a polyamide resin concentration of 1.0 g/dl is from 1.5 to 6.0. If $\eta r$ is less than 1.5, the molded product may become brittle and is deteriorated in the physical properties, whereas if $\eta r$ exceeds 6.0, a high melt viscosity may result to worsen the molding processability.

EXAMPLES

[Evaluation Method]

The present invention is described in greater detail below by referring to Examples, but the present invention is not limited thereto. Incidentally, in Examples, the structural analysis, the calculation of number-average molecular weight, the calculation of end group concentration and the measurement of relative viscosity were performed by the following methods.

(1) Structural Analysis

Identification of the primary structure was performed by $^1$H-NMR. The $^1$H-NMR was measured using AVANCE 500 manufactured by Bruker BioSpin K. K.; solvent: deuterated sulfuric acid, and SCANS: 1,024.

(2) Number Average Molecular Weight (Mn)

The number average molecular weight (Mn) was calculated based on the signal intensity determined from the $^1$H-NMR spectrum, for example, in the case of a polyoxamide resin starting from dibutyl oxalate and a diamine composed of 1,9-nonanediamine and 2-methyl-1,8-octanediamine in which the molar ratio of 1,9-nonanediamine to 2-methyl-1,8-octanediamine is 85:15 [hereinafter this resin is simply referred to as "PA92(NMDA/MODA=85/15)"], according to the following formula:

$$Mn = np \times 212.30 + n(NH_2) \times 157.28 + n(OBu) \times 129.14 + n(NHCHO) \times 29.14$$

In the formula above, each term is defined as follows.

np=Np/[N(NH$_2$)+N(NHCHO)+N(OBu))/2]
n(NH$_2$)=N(NH$_2$)/[(N(NH$_2$)+N(NHCHO)+N(OBu))/2]
n(NHCHO)=N(NHCHO)/[(N(NH$_2$)+N(NHCHO)+N(OBu))/2]
n(OBu)=N(OBu)/[(N(NH$_2$)+N(NHCHO)+N(OBu))/2]
Np=Sp/sp−N(NHCHO)
N(NH$_2$)=S(NH$_2$)/s(NH$_2$)
N(NHCHO)=S(NHCHO)/s(NHCHO)
N(OBu)=S(OBu)/s(OBu)

Here, each term means the following.

Np: The total number of repeating units in the molecular chain, excluding the terminal units of PA92(NMDA/MODA=85/15).

np: The number of repeating units in the molecular chain per one molecule.

Sp: The integration value of signals (in the vicinity of 3.1 ppm) based on protons of the methylene group adjacent to an oxamide group in the repeating unit in the molecular chain, excluding the terminals of PA92(NMDA/MODA=85/15).

sp: The number of hydrogens counted in the integration value Sp (four hydrogens).

N(NH$_2$): The total number of amino end groups of PA92 (NMDA/MODA=85/15).

n(NH$_2$): The number of amino groups end per one molecule.

S(NH$_2$): The integration value of signals (in the vicinity of 2.6 ppm) based on protons of the methylene group adjacent to a amino end group of PA92(NMDA/MODA=85/15).

s(NH$_2$): The number of hydrogens counted in the integration value S(NH$_2$) (two hydrogens).

N(NHCHO): The total number of formamide end groups of PA92(NMDA/MODA=85/15).

n(NHCHO): The number of formamide end groups per one molecule.

S(NHCHO): The integration value of signals (7.8 ppm) based on protons of the formamide group of PA92 (NMDA/MODA=85/15).

s(NHCHO): The number of hydrogens counted in the integration value S(NHCHO) (one hydrogen).

N(OBu): The total number of butoxy end groups of PA92 (NMDA/MODA=85/15).

n(OBu): The number of butoxy end groups per one molecule.

S(OBu): The integration value of signals (in the vicinity of 4.1 ppm) based on protons of the methylene group adjacent to an oxygen atom of the butoxy end group of PA92(NMDA/MODA=85/15)

s(OBu): Th number of hydrogens counted in the integration value S(OBu) (two hydrogens).

(3) End Group Concentration

In the case of using dibutyl oxalate, the amino end group concentration [NH$_2$], the butoxy end group concentration [OBu] and the formamide end group concentration [NHCHO] were determined according to the following formulae, respectively.

Amino end group concentration [NH$_2$]=n(NH$_2$)/Mn
Butoxy end group concentration [OBu]=n(OBu)/Mn
Formamide end group concentration [NHCHO]=n(NHCHO)/Mn (4) Relative Viscosity (ηr)

As for ηr, the relative viscosity to a 96% sulfuric acid solution was measured using a 96% sulfuric acid solution having a polyamide resin concentration of 1.0 g/dl, at 25° C. by means of an Ostwald-type viscometer.

Example 1

Into a 1 L-volume pressure-resistance vessel equipped with a stirrer, a thermometer, a torque meter, a pressure gage, a nitrogen gas inlet, a pressure release port, a polymer collection port and a raw material charging port to which a raw material feed pump was directly connected by an SUS316-made pipe having a diameter of ⅛ inch, 59.76 g (0.3776 mol) of 1,9-nonanediamine and 10.55 g (0.06663 mol) of 2-methyl-1,8-octanediamine were charged. An operation of pressurizing the inside of the pressure-resistant vessel to 3.0 MPa with a nitrogen gas having a purity of 99.9999% and then releasing the nitrogen gas to atmospheric pressure was repeated 5 times, and the temperature of the vessel was then raised under a confining pressure. After raising the internal temperature to 210° C. over 2 hours, 89.33 g (0.4417 mol) of dibutyl oxalate was injected into the reaction vessel by the raw material feed pump at a flow rate of 5 ml/min over 17 minutes. Here, the internal pressure in the pressure-resistant vessel rose to 0.95 MPa due to 1-butanol produced by the polycondensation reaction, and the internal temperature rose to 217° C. Immediately after the injection of dibutyl oxalate, temperature rise was started and the internal temperature was raised to 260° C. over 1.5 hours. At this time, the internal pressure in the vessel was 2.25 MPa. When the internal temperature reached 260° C., the stirring was immediately stopped, and 1-butanol produced by the polycondensation reaction was collected from the pressure release port over 17 minutes. The inside of the system was returned to atmospheric pressure and then put under nitrogen flow, and the polymerization product was collected from the bottom of the vessel. The obtained polymerization product was a white polymer.

Comparative Example 1

The inside of a separable flask having an inner volume of 300 ml and being equipped with a stirrer, an air cooling tube, a nitrogen inlet tube and a raw material charging port was replaced with a nitrogen gas having a purity of 99.9999%, and 42.07 g (0.2079 mol) of dibutyl oxalate was charged into the flask. While keeping this vessel at 20° C., 27.95 g (0.1766 mol) of 1,9-nonanediamine and 4.93 g (0.0312 mol) of 2-methyl-1,8-octanediamine were charged, and a polymerization reaction was performed. At this time, the polymer was immediately precipitated without dissolving in butanol produced by the polycondensation reaction. Incidentally, all of the operations from charging of raw materials until the completion of reaction were performed under nitrogen flow at 50 ml/min. The obtained polymerization product was in a white powder form.

Comparative Example 2

A polycondensation reaction was performed in the same manner as in Example 1 except that a separable flask having an inner volume of 5 liters and being equipped with a stirrer, an air cooling tube, a nitrogen inlet tube and a raw material charging port was used, 1,211 g (5.9871 mol) of dibutyl oxalate, 807.6 g (5.102 mol) of 1,9-nonanediamine and 142.5 g (0.9004 mol) of 2-methyl-1,8-octanediamine were charged and all of the operations until the completion of reaction were performed under nitrogen flow at 20 ml/min. At this time, the polymer was immediately precipitated without dissolving in butanol produced by the polycondensation reaction. The obtained polyamide was in a white powder form.

The ηr, end group concentration and number-average molecular weight of each of polyoxamide resins obtained in Example 1 and Comparative Examples 1 and 2 are shown in Table 1.

TABLE 1

|  |  | Example 1 | Comparative Example 1 | Comparative Example 2 |
|---|---|---|---|---|
| Relative viscosity ηr*[1] |  | 2.13 | 1.47 | 1.43 |
| Number average molecular weight*[2] |  | 10600 | 5300 | 800 |
| Terminal group concentration $10^{-5}$ eq/g*[2] | [—NH$_2$] | 10.8 | 24.5 | 6.7 |
|  | [—OBu] | 0.8 | 13.3 | 248.5 |
|  | [—NHCHO] | 7.3 | 0 | 0 |

*[1] A 96% sulfuric acid solution in 1.0 g/dl.
*[2] A calculated value determined from NMR measurement.

As seen from Table 1, in Example 1, a polyoxamide having a high molecular weight compared with Comparative Examples was obtained.

FIG. 1 shows the NMR spectrum in deuterated sulfuric acid of the polyoxamide resin obtained in Example 1 and the attribution of the obtained peaks. In FIG. 1, signs a to o in the chemical formula correspond to signs a to o denoted at peaks of the NMR spectrum.

Industrial Applicability

As described in detail above, in the method of the present invention, an oxalic acid diester and a diamine as raw materials are mixed in a pressure-resistant vessel, and the mixture is subjected to polymerization under pressure in the presence of an alcohol produced by a condensation reaction, whereby a polyoxamide resin is obtained. Accordingly, not only the conventionally known pre-polymerization step in a solvent but also the step for distilling off the solvent and the time and energy involved therein can be omitted, and a polyoxamide resin can be produced with high efficiency.

The invention claimed is:

1. A method for producing a polyamide resin comprising:
heating diamines composed of 1,9-nonanediamine and 2-methyl-1,8-octanediamine in a sealed vessel to a reaction temperature of from 180 to 240° C.;
adding an oxalic acid diester to the heated diamines at the reaction temperature;
conducting a polycondensation reaction in the sealed vessel to form a polyamide and an alcohol, whereby the polyamide maintains a solution state in the alcohol;
wherein the pressure in the vessel rises to 0.95 MPa during the addition of oxalic acid diester to the diamines, and the pressure in the vessel further rises to 2.25 MPa after completing the addition of the oxalic acid diester to the diamines.

2. The method of claim 1, wherein the pressure in the sealed vessel is subsequently released while distilling off the alcohol, and the polycondensation reaction is continued under atmospheric pressure or under reduced pressure.

3. The method of claim 1, wherein the molar ratio of the oxalic acid diester to the diamines is from 0.8 to 1.5.

4. The method of claim 1, wherein the molar ratio of 1,9-nonanediamine to 2-methyl-1,8-octanediamine is from 6:94 to 99:1.

5. The method of claim 1, wherein after completing the addition of oxalic acid diester to diamines, the reaction temperature in the sealed vessel is raised to a temperature not lower than the melting point of the polyamide resin and not higher than the temperature causing thermal decomposition.

6. The method of claim 5, wherein after completing the addition of oxalic acid diester to diamines, the reaction temperature in the sealed vessel is raised to a temperature of from 240 to 280° C.

7. The method of claim 2, wherein the polycondensation reaction is continued under a pressure from 0.1 to 760 Torr.

* * * * *